United States Patent [19]

Aagano et al.

[11] Patent Number: 4,687,937

[45] Date of Patent: Aug. 18, 1987

[54] RESIDUAL IMAGE ERASURE CONTROL USING PHOTOMULTIPLIER BLEEDER RESISTOR VOLTAGE

[75] Inventors: Toshitaka Aagano; Yoshimi Takasaki, both of Kanagawa, Japan

[73] Assignee: Fuji Photo Film Co., Ltd., Japan

[21] Appl. No.: 741,337

[22] Filed: Jun. 5, 1985

[30] Foreign Application Priority Data

Jun. 6, 1984 [JP] Japan .................. 59-116104

[51] Int. Cl.$^4$ ............................... G01T 1/105
[52] U.S. Cl. ..................... 250/484.1; 250/327.2
[58] Field of Search ............... 250/327.2, 484.1

[56] References Cited

U.S. PATENT DOCUMENTS

| | | | |
|---|---|---|---|
| 4,125,330 | 11/1978 | Schild | 356/416 |
| 4,236,078 | 11/1980 | Kotera et al. | 250/363 R |
| 4,239,968 | 12/1980 | Kotera et al. | 250/327.2 |
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 364/515 |
| 4,346,295 | 8/1982 | Tanaka et al. | 250/327.2 |
| 4,387,428 | 6/1983 | Ishida et al. | 364/414 |
| 4,394,581 | 7/1983 | Takahashi et al. | 250/484.1 |
| 4,400,619 | 8/1983 | Kotera et al. | 250/327.2 |
| 4,584,482 | 4/1986 | Suzuki et al. | 250/459.1 |

Primary Examiner—Janice A. Howell
Assistant Examiner—Constantine Hannaher
Attorney, Agent, or Firm—Sughrue, Mion, Zinn, Macpeak and Seas

[57] ABSTRACT

In a radiation image recording and reproducing system using a stimulable phosphor sheet, a voltage generated at a bleeder resistor of a photomultiplier for conducting image read-out is detected at the step of radiation image read-out at least for the stimulable phosphor sheet or a portion thereof where the level of X-ray exposure amount is higher than a predetermined level, and the exposure amount of erasing light is controlled on the basis of the detected voltage. Or, the erasing light exposure amount is controlled on the basis of an output current of the photomultiplier when the output current is equal to or smaller than a predetermined value when is smaller than a saturated value of the output current, and the bleeder resistor voltage of the photomultiplier is detected and the erasing light exposure amount is controlled on the basis of the detected voltage when the output current of the photomultiplier is larger than the predetermined value.

8 Claims, 8 Drawing Figures

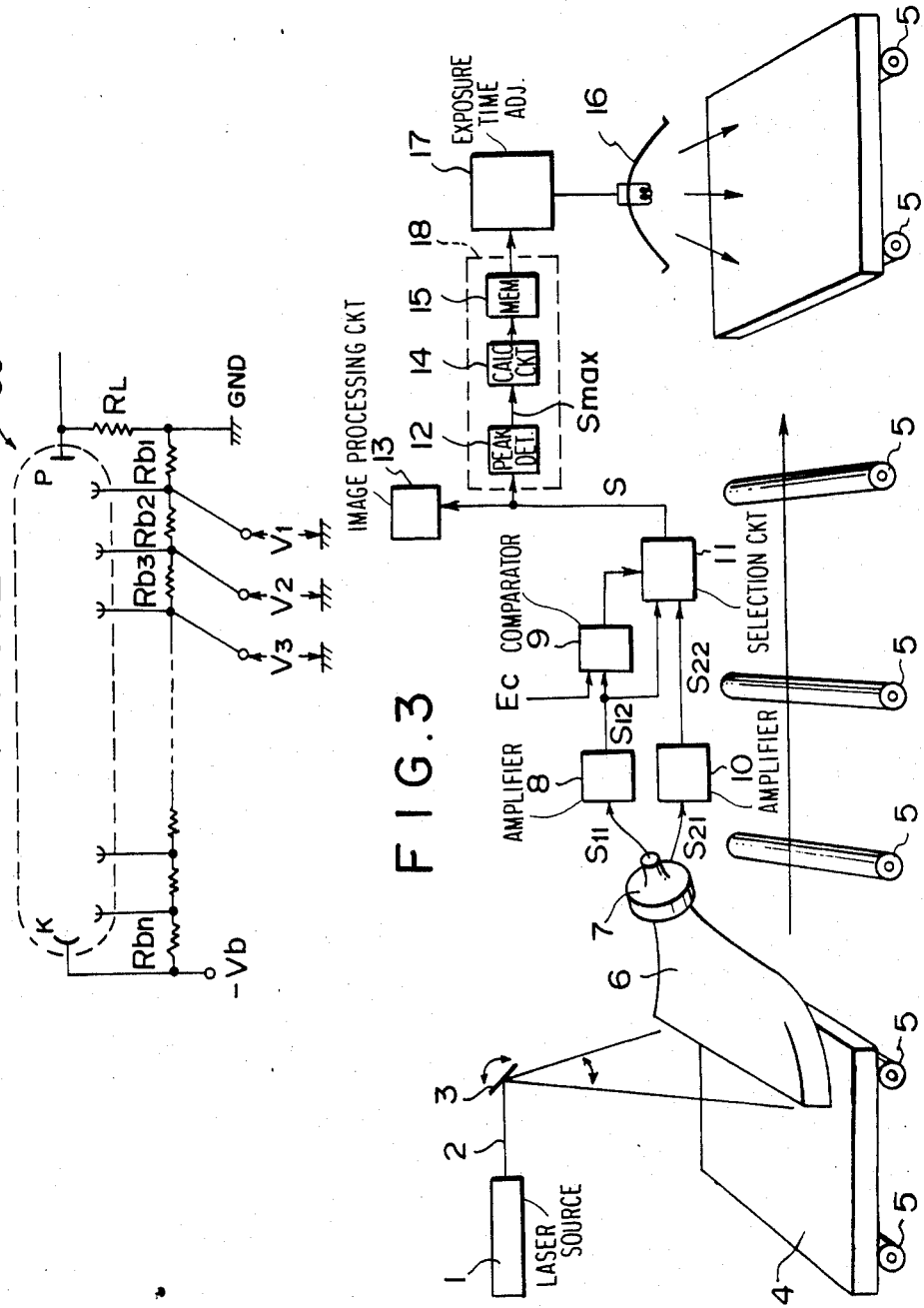

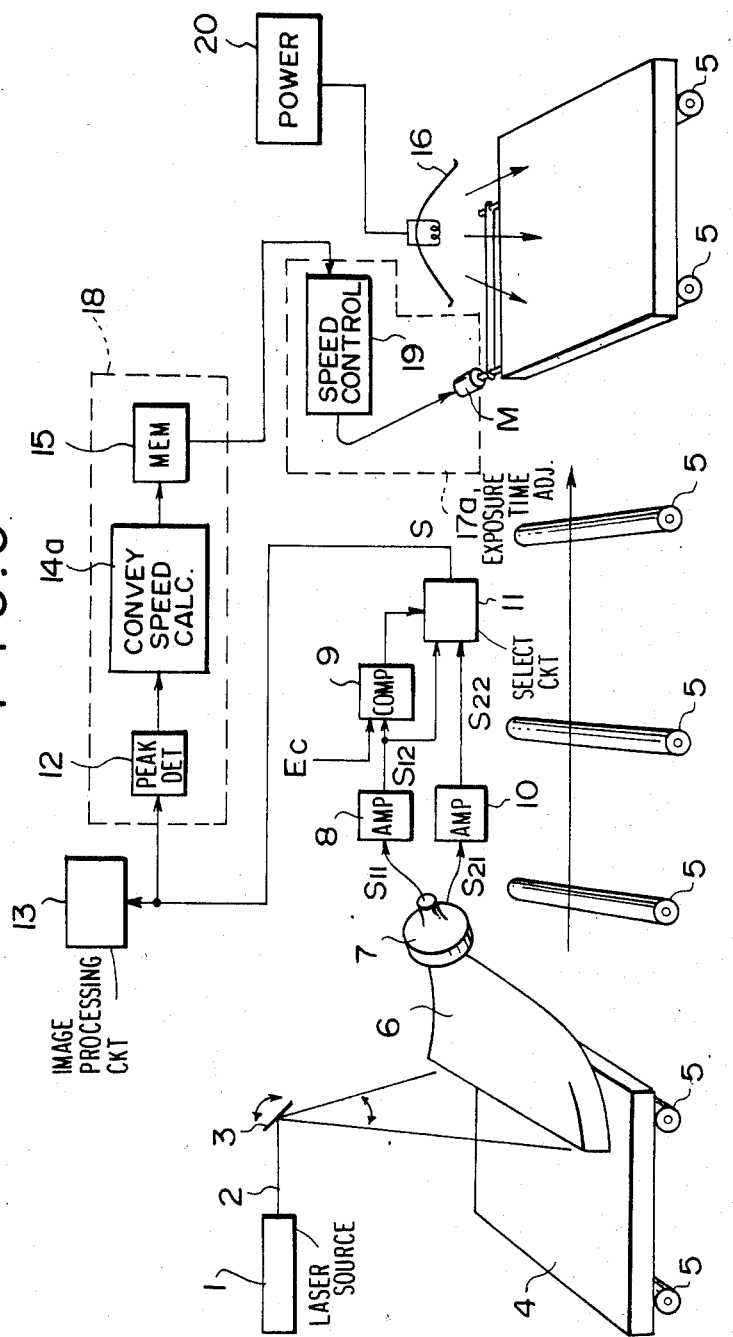
F I G. 5

RESIDUAL IMAGE ERASURE CONTROL USING PHOTOMULTIPLIER BLEEDER RESISTOR VOLTAGE

BACKGROUND OF THE INVENTION

1. Field of the Invention

This invention relates to a method of effectively erasing a residual image on a stimulable phosphor sheet which is used repeatedly, and an apparatus for carrying out the method. This invention particularly relates to a method of and apparatus for effectively erasing a residual image on the stimulable phosphor sheet repeatedly used in a radiation image recording and reproducing system wherein the stimulable phosphor sheet is exposed to a radiation to have a radiation image stored therein and then exposed to stimulating rays which cause the stimulable phosphor sheet to emit light in proportion to the stored radiation energy, the emitted light is detected and converted into an electric image signal, and the electric image signal is processed and used for reproducing a visible image.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Thus, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to radiation passing through an object to have a radiation image stored therein, and is then scanned with stimulating rays such as a laser beam which cause it to emit light in proportion to the radiation energy stored. The light emitted by the stimulable phosphor sheet upon stimulation thereof is photoelectrically detected and converted to an electric image signal, which is processed as desired to reproduce a visible image having an improved quality, particularly a high diagnostic efficiency and accuracy. The finally obtained visible image may be reproduced in the form of a hard copy or may be displayed on a cathode ray tube (CRT). The stimulable phosphor sheet used in the radiation image recording and reproducing system may be in any of various forms such as a panel, drum or the like, which are herein generally referred to as sheets. For economical reasons, it is desirable that the stimulable phosphor sheet be used repeatedly.

Theoretically, when the stimulable phosphor sheet is exposed to stimulating rays of a sufficient intensity to cause the sheet to emit light in proportion to the stored radiation energy at the image read-out step, the stored radiation energy should be released completely and disappear. Actually, however, since the intensity of the stimulating rays used at the image read-out step is not sufficient to completely erase the stored radiation energy, a part of the stored radiation energy remains unerased in the stimulable phosphor sheet so that when the sheet is used repeatedly, the unerased radiation energy causes noise to arise in the visible image reproduced from the reused sheet.

The inventors conducted experiments to find what level of radiation energy of the residual image on the reused stimulable phosphor sheet causes noise to arise in the reproduced visible image to an extent adversely affecting the image viewing, particularly diagnosis. From the results of these experiments, it has been found that, in order to eliminate the detrimental noise due to the residual image, the radiation energy of the radiation image stored in the stimulable phosphor sheet must be erased to the order of $10^{-4}$ to $10^{-6}$. Stated differently, the original radiation energy stored in the sheet must be erased to a level between 0.01 and 0.0001 when the maximum of the original level is 100.

As described, for example, in U.S. Pat. No. 4,400,619, the aforesaid residual image can be erased by stimulating the stimulable phosphor sheet by light having a wavelength within the stimulation wavelength range for the stimulable phosphor constituting the stimulable phosphor sheet before the next image recording on the stimulable phosphor sheet, thereby sufficiently releasing the stored radiation energy. In order to completely erase the residual image, the light exposure amount (i.e. illuminance $\times$ time) should be adjusted to be as large as possible. However, in order to erase the radiation energy of the previously stored radiation image to the order of $10^{-4}$ to $10^{-6}$, the stimulable phosphor sheet must be exposed to a high illuminance for a long period, for example to 30,000 lx for 100 to 1,000 seconds by use of a tungsten-filament lamp or the like. Therefore, from the viewpoint of decrease in energy requirement and erasing time, and service life of the erasing light source, it is desirable that the light exposure amount be limited to the minimum necessary value.

In order to satisfy the two incompatible requirements described above, the applicant in Japanese Unexamined Patent Publication No. 58(1983)-80633 (U.S. patent application No. 440,046, now U.S. Pat. No. 4,584,482), proposed detecting the residual radiation energy level stored in a stimulable phosphor sheet and adjusting the erasing light exposure amount in accordance with the detected residual radiation energy level. Since the level of the radiation energy remaining on the stimulable phosphor sheet is correlated with the level of energy of light emission from the sheet at the image read-out step, it is possible to detect the level of the residual radiation energy of the basis of the read-out signal, i.e. the output of an image read-out photodetector. Or, a photodetector of the same type as the image read-out photodetector may be used for detecting the level of residual radiation energy, and the level of residual radiation energy may be detected on the basis of the output of the photodetector.

In the case of a radiation image of the human body or the like, since the level of residual radiation energy is different among various portions of the image, the erasing light exposure amount is generally controlled so that the highest level of residual radiation energy can be released. Also, the image portion at which the level of residual radiation energy is highest is a solid image portion exposed to the largest amount of radiation at the image recording step. When a photomultiplier is used as the image read-out photodetector and light emitted by the solid image portion of the stimulable phosphor sheet is detected by use of the photomultiplier, since the image read-out gain is adjusted to suit the image read-out, the output current of the photomultiplier goes to the saturated condition. Or, the output current approaches the saturated condition, and the increase thereof with respect to an increase in the incident light amount gradually becomes small. In this case, the level of residual radiation energy at the solid image portion cannot be measured accurately. On the other hand, when an independent photomultiplier is specially used for detecting the level of residual radiation energy, since the gain of the photomultiplier can be adjusted to suit detection of the level of residual radiation energy at the solid image portion independently of image read-out, it is possible to measure the level of residual radiation energy at the solid image portion. However, when the photodetector is independently used for detecting the level of residual radiation energy, the size and the cost of the apparatus increase.

SUMMARY OF THE INVENTION

The primary object of the present invention is to provide a method of erasing a residual image on a stimulable phosphor sheet, which accurately detects the level of residual radiation energy by use of an image read-out photomultiplier and controls the erasing light exposure amount in accordance with the detected level of residual radiation energy.

Another object of the present invention is to provide a method of erasing a residual image on a stimulable phosphor sheet, which conducts residual image erasing economically and reliably and which is advantageous for minimizing the size of the radiation image read-out apparatus.

The specific object of the present invention is to provide an apparatus for carrying out the method.

The inventors conducted experiments for accomplishing the above objects and found that, even after the output current of the image read-out photomultiplier approaches the saturated condition and the increase of the output current with respect to the increase in the incident light intensity gradually becomes small, the voltage generated at a bleeder resistor of the photomultiplier decreases with sufficient sensitivity as the incident light amount increases when the incident light amount is within the range corresponding to the maximum level of residual radiation energy on the stimulable phosphor sheet.

FIG. 1 is a graph showing the relationship between the X-ray exposure amount used for solid image recording on a stimulable phosphor sheet and the voltage generated at the bleeder resistor of a photomultiplier (hereinafter referred to as the bleeder resistor voltage) as measured when the stimulable phosphor sheet carrying the solid X-ray image stored therein was exposed to stimulating rays and light emitted by the sheet was detected by the photomultiplier. The photomultiplier used had a configuration as schematically shown in FIG. 2. Measurement of bleeder resistor voltages V1, V2 and V3 was conducted on bleeder resistors Rb1, Rb2 and Rb3 (56 kΩ each) positioned in this order from the plate P side to the cathode K side of a photomultiplier 50.

The gain of the photomultiplier 50 is adjusted to suit the detection of light emitted by the stimulable phosphor sheet carrying an X-ray image of an object such as the human body. X-ray image recording for the human body or the like is normally conducted at 100 mR or less. In the case where the gain of the photomultiplier 50 is adjusted to suit the normal X-ray image recording and X-ray image recording is conducted by use of an exposure amount larger than the normal X-ray exposure amount, when the photomultiplier 50 detects a solid image portion of the X-ray image, the output current of the photomultiplier 50 goes to or approaches the saturated condition and the residual radiation energy level at the solid image portion cannot be measured accurately. However, as shown in FIG. 1, it was found that the bleeder resistor voltage decreases with sufficient sensitivity to increases in the X-ray exposure amount, i.e. to increases in light emission amount of the stimulable phosphor sheet detected by the photomultiplier 50, over a sufficiently wide range of the X-ray exposure amount exceeding the normal X-ray exposure amount without approaching the saturated condition.

In the present invention, on the basis of the novel finding described above, the aforesaid objects are accomplished by measuring the bleeder resistor voltage in the photomultiplier to detect the level of residual radiation energy on the stimulable phosphor sheet, and controlling the light exposure amount in residual image erasing on the basis of the detected level of residual radiation energy.

The method of erasing a residual image on a stimulable phosphor sheet in accordance with the present invention is characterized by detecting the level of residual radiation energy on the stimulable phosphor sheet on the basis of a bleeder resistor voltage at least for the stimulable phosphor sheet or a portion of the stimulable phosphor sheet where the level of X-ray exposure amount is higher than a predetermined level, and controlling the amount of exposure to residual image erasing light.

The apparatus for erasing a residual image on a stimulable phosphor sheet in accordance with the present invention is characterized by the provision of a voltage detecting means for detecting the voltage generated at a bleeder resistor of a photomultiplier for conducting image read-out at the image read-out step, and a control means for controlling the light exposure amount in residual image erasing in accordance with the voltage detected by the voltage detecting means.

In the present invention, since the level of residual radiation energy on the stimulable phosphor sheet is detected in advance and the light exposure amount in residual image erasing is controlled in accordance with the detected level of residual radiation energy, it is possible to erase the residual image economically and reliably by use of the minimum necessary light exposure amount (illuminance × time). Further, since detection of the level of residual radiation energy is conducted by using the photomultiplier for image read-out and detecting the bleeder resistor voltage therein, it becomes possible to minimize the size and cost of the radiation image read-out apparatus. Also, it is possible to accurately detect the level of residual radiation energy even when the X-ray exposure amount is larger than the normal value, and therefore to efficiently control the light exposure amount in residual image erasing for every sheet in accordance with the level of residual radiation energy.

By "a predetermined level" of the X-ray exposure amount is meant the level thereof at which it becomes impossible for the output current of the photomultiplier to change with sufficient sensitivity to a small change in intensity of incident light to the photomultiplier corresponding to the X-ray exposure amount from the viewpoint of the accuracy required in residual image erasing. Comparison of the X-ray exposure amount with the predetermined level can be conducted by detecting the output current of the photomultiplier or on the basis of the image recording conditions such as the X-ray tube voltage.

When the level of the X-ray exposure amount is lower than the predetermined level, the output current of the photomultiplier is sufficiently sensitive to a change in intensity of incident light to the light modulator corresponding to the X-ray exposure amount and changes approximately linearly. Therefore, in this case, it is possible to control the light exposure amount in residual image erasing sufficiently accurately on the basis of the output current of the photomultiplier.

Accordingly, it is also possible to control the light exposure amount in residual image erasing in accordance with the output current of the photomultiplier when the X-ray exposure amount is on the level at which the corresponding output current of the photomultiplier for radiation image read-out is not larger than a predetermined value which is smaller than the saturated output current, and to detect the voltage generated at the bleeder resistor of the photomultiplier and control the light exposure amount in residual image erasing on the basis of the detected bleeder resistor voltage when the X-ray exposure amount is on the level at which the output current of the photomultiplier is larger than the aforesaid predetermined value.

As the predetermined value smaller than the saturated output current, it is possible to select any output current of the photomultiplier on such a level that the output current of the photomultiplier is sufficiently sensitive to a small change in X-ray exposure amount from the viewpoint of the accuracy required for residual image erasing. The predetermined value should preferably be selected from the output current values at which the photomultiplier output current versus X-ray exposure amount (incident light amount) curve is approximately linear, and should more preferably be selected from the output current values corresponding to the X-ray exposure amounts (incident light amounts) at which the absolute value of the gradient of the photomultiplier output current versus X-ray exposure amount (incident light amount) curve is equal to the absolute value of the gradient of the bleeder resistor voltage versus X-ray exposure amount (incident light amount) curve.

In the present invention, radiation image read-out also embraces preliminary read-out conducted for grasping the radiation image stored in the stimulable phosphor sheet prior to final read-out for reproduction of the radiation image as disclosed, for example, in Japanese Unexamined Patent Publication Nos. 58(1983)-67241 (U.S. Pat. No. 4,527,060) and 58(1983)-83937 (U.S. Pat. No. 4,496,838). This is because, in general, the amount of radiation energy stored in the stimulable phosphor sheet prior to the preliminary read-out is proportional to the amount of radiation energy remaining in the sheet after the final read-out.

In the present invention, control of the light exposure amount in residual image erasing based on the bleeder resistor voltage or the output current of the photomultiplier may be carried out manually or automatically.

When the aforesaid control is carried out manually, it is advantageous for the bleeder resistor voltage or the output current of the photomultiplier corresponding to the level of residual radiation energy on the stimulable phosphor sheet and the light exposure amount in residual image erasing optimal for the level of residual radiation energy to be calculated in advance, and the light exposure amount in residual image erasing to be designated on the basis of the obtained bleeder resistor voltage or the output current of the photomultiplier.

In the present invention, it is possible to employ any method for controlling the light exposure amount in residual image erasing. For example, only the exposure time may be controlled, the illuminance of the erasing light source and the exposure time may be controlled, or the residence time of the stimulable phosphor sheet at the position exposed to erasing light may be controlled while the erasing light source is maintained on.

In the present invention, the control of the light exposure amount in residual image erasing should preferably be conducted on the basis of the maximum level of residual radiation energy on the stimulable phosphor sheet.

However, when the contrast of the radiation image stored in the stimulable phosphor sheet is low, for example, when no solid image portion is present thereon, the light exposure amount in residual image erasing may be controlled on the basis of an average value of residual radiation energy, instead of the maximum level of residual radiation energy.

In order to improve the signal-to-noise ratio, it is preferable that the stimulable phosphor emit light having a wavelength range not overlapping the range of wavelength of the stimulating rays employed to excite the stimulable phosphor. Preferably, when a stimulating ray source which emits stimulating rays having a wavelength within the range between 500 nm and 900 nm is used, a stimulable phosphor which emits light having a wavelength within the range between 300 nm and 500 nm should be selected.

As the stimulable phosphor, for example, rare earth activated alkaline earth metal fluorohalide phosphor is preferred. One example of this phosphor is, as shown in DE-OS No. 2,928,245 (U.S. patent application Ser. No. 57,080, now abandoned), a phosphor represented by the formula $(Ba_{1-x-y}, Mg_x, Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x}, M^{II}x)FX:yA$ wherein $M^{II}$ is at least one of Mg, Ca, Sr, Zn and Cd, X is at least one of Cl, Br and I, A is at least one of Eu, Tb, Ce, Tm, Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; BaO·$xAl_2O_3$:Eu wherein $0.8 \leq x \leq 10$; and $M^{II}O \cdot xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 < x < 0.1$, as shown in U.S. Pat. No. 4,236,078. Also, as the stimulable phosphor can be used $M^{II}X_2 \cdot aM^{II}X'_2:xEu^{2+}$ wherein $M^{II}$ is at least one alkaline earth metal selected from the group consisting of Ba, Sr and Ca, each of X and X' is at least one halogen selected from the group consisting of Cl, Br and I, $X \neq X'$, a is a number satisfying $0.1 \leq a \leq 10.0$, and x is a number satisfying $0 < x \leq 0.2$, as described in Japanese Patent Application No. 58(1983)-193161 (U.S. patent application Ser. No. 834,886, which is a continuation of Ser. No. 660,987). Among the above enumerated phosphors, the rare earth activated alkaline earth metal halide phosphor is the most preferable, among which the bivalent europium activated alkaline earth metal halide phosphor is the most preferable.

Further, barium fluorohalide phosphors added with a metal fluoride as disclosed in European Patent Publication No. 21,342 (U.S. Pat. No. 4,512,911), or barium fluorohalide phosphors added with at least one of a metal chloride, a metal bromide and a metal iodide as disclosed in European Patent Publication No. 29,963 (U.S. patent application Ser. Nos. 794,377 and 739,773, both currently pending) are also preferable because of their improved light emitting characteristics.

It is also desirable to color the phosphor layer of the stimulable phosphor sheet made of the above phosphor by use of pigments or dyes to improve the sharpness of the image obtained thereby as disclosed in U.S. Pat. No. 4,394,581.

BRIEF DESCRIPTION OF THE DRAWINGS

FIG. 2 is a schematic view showing the configuration of the photomultiplier used in the residual image erasing apparatus in accordance with the present invention, FIG. 3 is a schematic view showing an embodiment of the residual image erasing apparatus in accordance with the present invention.

DESCRIPTION OF THE PREFERRED EMBODIMENTS

Figure 1:
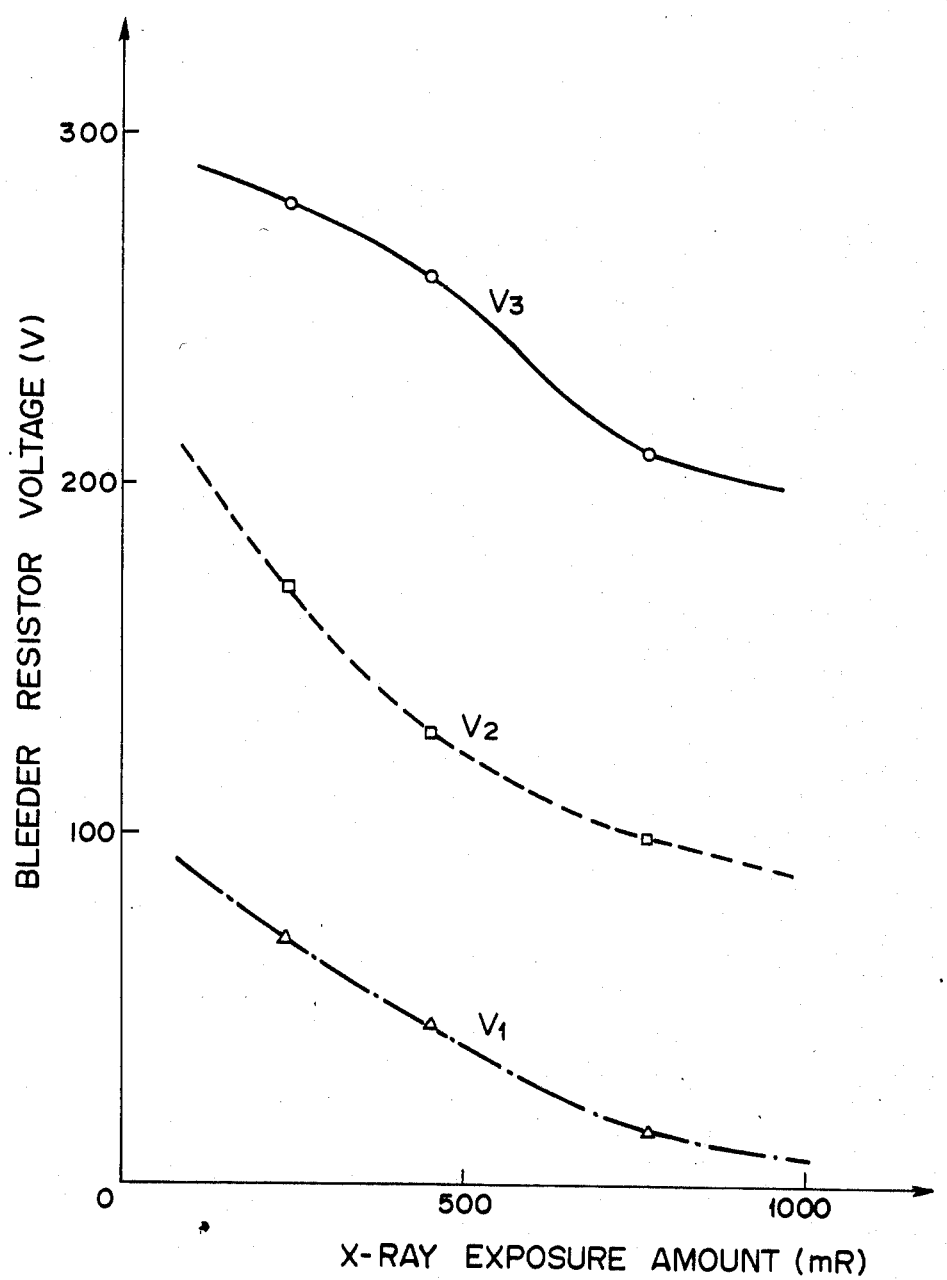
FIG. 1 is a graph showing the relationship between the X-ray exposure amount of a stimulable phosphor sheet and the voltage generated at a bleeder resistor of a photomultiplier when the stimulable phosphor sheet is exposed to stimulating rays and light emitted by the sheet is detected by the photomultiplier.

The present invention will hereinbelow be described in further detail with reference to the accompanying drawings.

Referring to FIG. 3, a laser beam source 1 emits a laser beam 2, and a light deflector 3 constituted by a galvanometer mirror or the like is positioned on the optical path of the laser beam 2 for one-dimensionally deflecting the laser beam 2 and making it impinge upon a stimulable phosphor sheet 4 carrying a radiation image stored therein. The stimulable phosphor sheet 4 is moved at a predetermined speed by conveying rollers 5, so that the whole surface of the sheet 4 is exposed to the laser beam 2. When the stimulable phosphor sheet 4 is exposed to the laser beam 2, it emits light in proportion to the stored radiation energy, and the emitted light enters a light guide member 6. The light guide member 6 has a linear light input face positioned close to the scanning line on the stimulable phosphor sheet 4, and a ring-shaped light output face in close contact with the light receiving face of a photomultiplier 7 used as the photodetector. The light guide member 6 is made of a transparent thermoplastic resin sheet such as an acrylic resin sheet so that the light entering from the light input face can be guided to the light output face by total reflection inside of the light guide member 6. The light guide member 6 may be of a shape and a material as disclosed in U.S. Pat. No. 4,346,295 and may be manufactured by use of a method disclosed therein.

The photomultiplier 7 may, for example, be a photomultiplier having S-11 type spectral sensitivity. The light receiving face of the photomultiplier 7 is provided with a filter (not shown) for selectively transmitting the light having a special wavelength distribution and cutting off the light having the wavelength distribution of the stimulating rays, so that the photomultiplier 7 can detect only the light emitted by the stimulable phosphor sheet 4 at a high signal-to-noise ratio. The output current signal S11 of the photomultiplier 7 is input to an amplifier 8, and the output signal S12 of the amplifier 8 is input to a comparator 9 which compares the output signal S12 of the amplifier 8 with a predetermined reference signal Ec. On the other hand, a bleeder resistor voltage signal S21 representing the voltage generated at a predetermined bleeder resistor of the photomultiplier 7 is sent to a non-linear amplifier 10. As the predetermined bleeder resistor, there should preferably be selected the one exhibiting the largest change in bleeder resistor voltage among a plurality of the bleeder resistors. Then, the output signal S22 of the non-linear amplifier 10 and the output signal S12 of the amplifier 8 are sent to a selection circuit 11. The selection circuit 11, which also receives a signal representing the result of comparison conducted by the comparator 9, selects one or the other of the output signal S21 of the amplifier 8 and the output signal S22 of the non-linear amplifier 10 on the basis of the signal fed by the comparator 9, and generates an output signal S.

Figure 4:
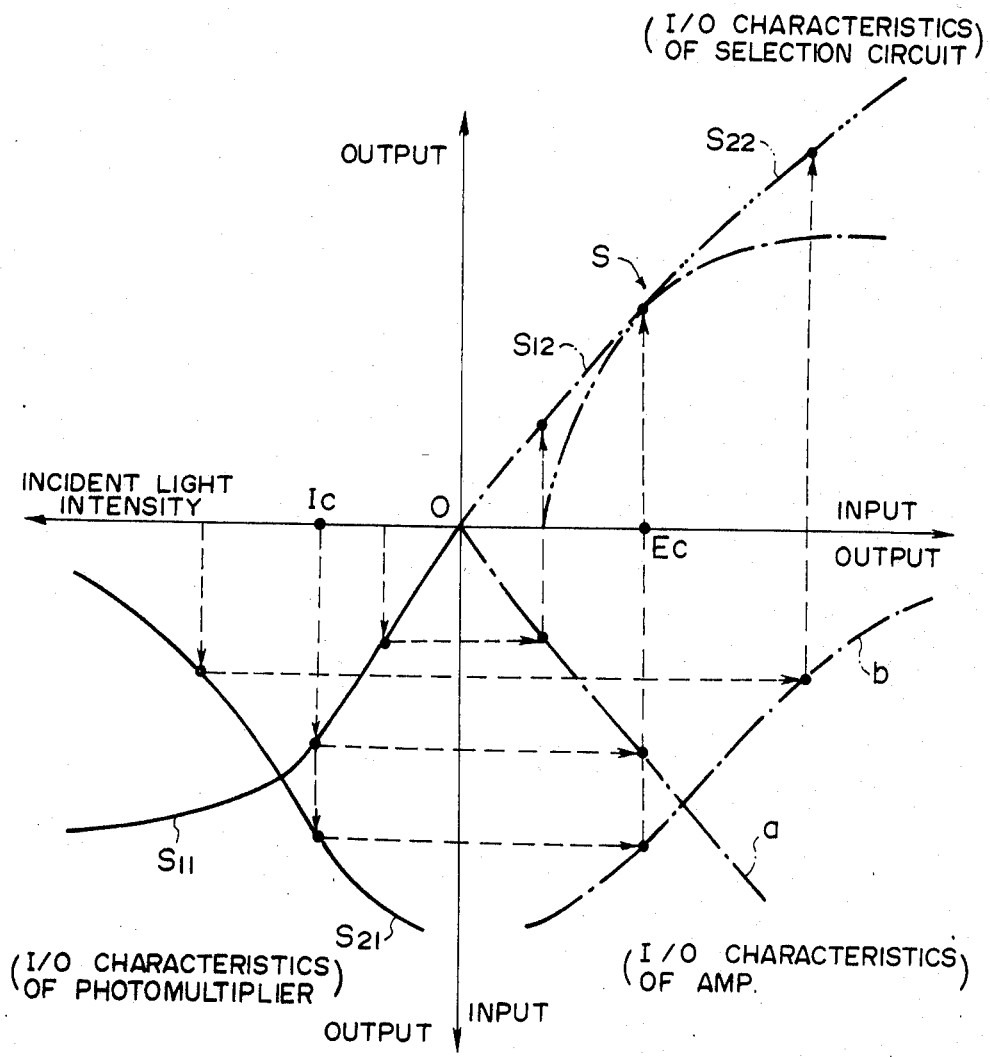
FIG. 4 is a graph showing the input and output characteristics of the photomultiplier, amplifier and selection circuit in the embodiment of FIG. 3, FIGS. 5, 6, 7 and 8 are schematic views showing further embodiments of the residual image erasing apparatus in accordance with the present invention.

Input and output characteristics of the photomultiplier 7, the amplifier 8, the non-linear amplifier 10 and the selection circuit 11 will now be described below with reference to FIG. 4.

Curve S11 represents the output current signal of the photomultiplier 7 which is output in accordance with the intensity of light incident on the photomultiplier 7. The output of the photomultiplier 7 gradually saturates when the incident light amount becomes equal to Ic or more. Curve S21 represents the output voltage level of the bleeder resistor of the photomultiplier 7 which is detected in accordance with the intensity of light incident on the photomultiplier 7. Even when the incident light amount becomes equal to Ic or more, the output voltage level of the bleeder resistor decreases approximately linearly without being saturated. On the other hand, the amplifier 8 exhibits the input and output characteristics as indicated by straight line a, and the non-linear amplifier 10 exhibits the input and output characteristics as indicated by curve b. Straight line S represents the input and output characteristics of the selection circuit 11, and is formed by combining a straight line portion of curve S12 representing the output of the amplifier 8 corresponding to the output signal S11 of the photomultiplier 7 with a straight line portion of curve S22 representing the output of the non-linear amplifier 10 corresponding to the output signal S21 representing the output voltage level of the bleeder resistor of the photomultiplier 7.

Therefore, as the output signal S of the selection circuit 11 in the aforesaid embodiment, the signal S12 obtained by amplifying the output signal S11 of the photomultiplier 7 by the amplifier 8 is output when the intensity of the light incident on the photomultiplier 7 is Ic or less, and the signal S22 obtained by amplifying the output signal S21 representing the output voltage level of the bleeder resistor of the photomultiplier 7 by the non-linear amplifier 10 is output when the intensity of light incident on the photomultiplier 7 is higher than Ic.

Reverting to FIG. 3, the output signal S of the selection circuit 11 is sent to a peak detector 12 which detects the maximum value Smax of the output signal S. The maximum value Smax represents the maximum intensity of the light emitted by the stimulable phosphor sheet 4, i.e. the value corresponding to the maximum level of residual radiation energy in the stimulable phosphor sheet 4.

The output Smax of the peak detector 12 is sent to an erasing light exposure time calculating circuit 14 which calculates the exposure time corresponding to Smax. The erasing light exposure time calculating circuit 14 calculates the erasing light exposure time on the basis of the predetermined relationship between the maximum value Smax and the erasing light exposure time. The output signal of the erasing light exposure time calculating circuit 14 is stored in a memory 15.

After the level of residual radiation energy on the stimulable phosphor sheet 4 is detected, the sheet 4 is conveyed by the conveying rollers 5 to a position below a residual image erasing lamp 16, and maintained to stand at this position. Then, an exposure time adjusting means 17 controls the on time of the lamp 16 on the basis of the value stored in the memory 15. The exposure time adjusting means 17 comprises a power source and a timer for the lamp 16, and controls the on time of the lamp 16 by activating the timer in accordance with the value stored in the memory 15.

By carrying out control as described above, the erasing light exposure amount is adjusted to a value necessary and sufficient for nearly completely releasing the radiation energy remaining at the solid image portion of the stimulable phosphor sheet 4. Thus, unnecessary energy consumption for erasing is minimized, and the service life of the lamp 16 becomes long.

The output signal S of the selection circuit 11 is also sent to an image processing circuit 13 which conducts an appropriate image processing, and the processing signal is used for reproducing a visible image as a hard copy or as displayed on a CRT.

In the aforesaid embodiment, the on time of the erasing lamp 16 is controlled by the control means for erasing light exposure amount comprising the exposure time adjusting means 17 and the exposure time calculating means 18 which is constituted by the peak detector 12, the erasing light exposure time calculating circuit 14 and the memory 15. However, it is also possible to continuously operate the erasing lamp 16 and to control the conveyance speed or the residence time of the stimulable phosphor sheet 4 below the erasing lamp 16. Such an embodiment will be described below with reference to FIG. 5.

The embodiment of FIG. 5 is similar to the embodiment of FIG. 3, except that a sheet conveyance speed calculating circuit 14a is used instead of the erasing light exposure time calculating circuit 14, and an exposure time adjusting means 17a comprising a speed control circuit 19 and a conveying roller drive motor M is used instead of the exposure time adjusting means 17 comprising the power source and a timer for the erasing lamp 16. This configuration is employed for the case where the erasing lamp 16 is continuously on. Reference numeral 20 in FIG. 5 denotes the power source for the lamp 16.

In the embodiment of FIGS. 3 and 5, the illuminance of the residual image erasing lamp is maintained constant, and only the exposure time of erasing light is controlled. However, it is also possible to control the illuminance and the exposure time of erasing light. Such an embodiment will be described below with reference to FIG. 6.

Figure 6:
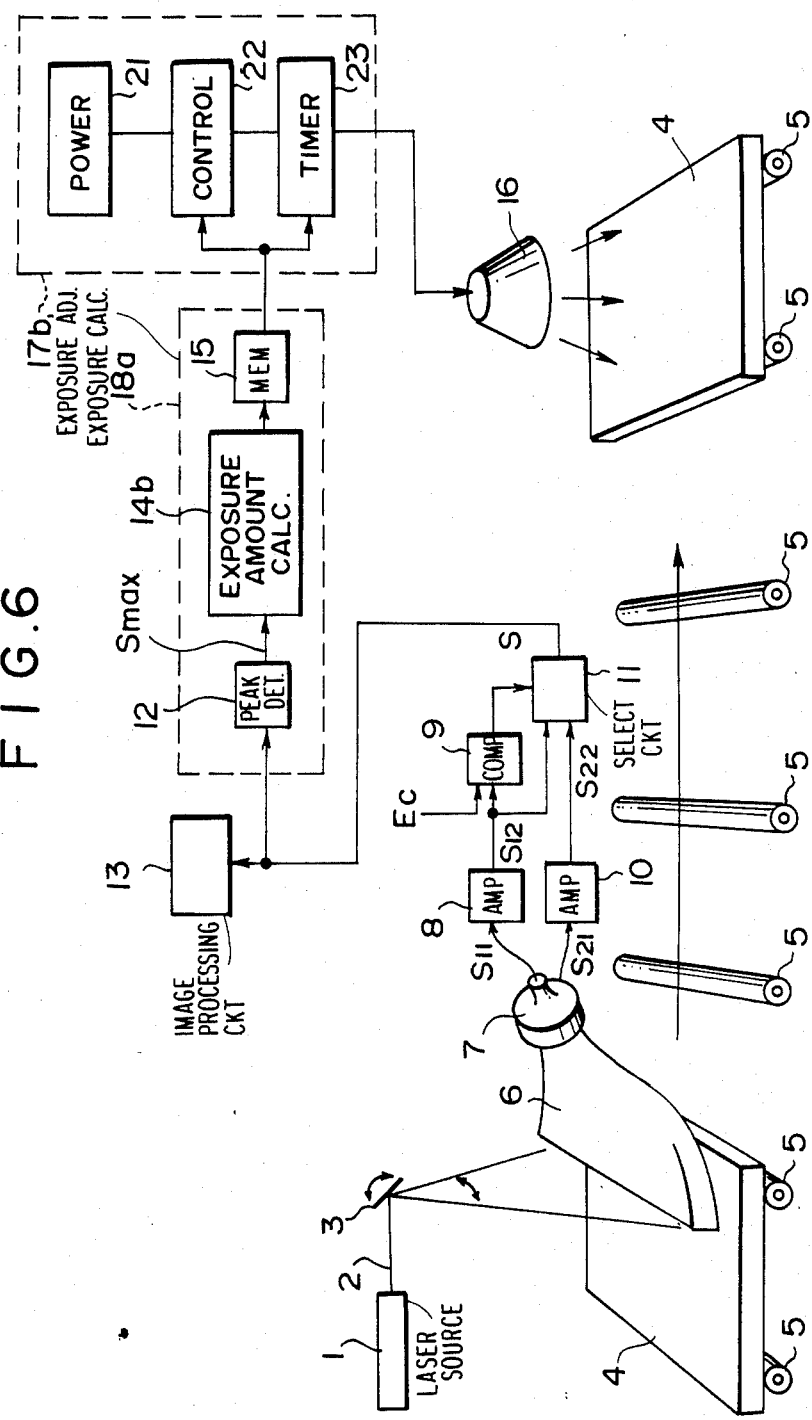

The embodiment of FIG. 6 is similar to the embodiment of FIG. 3, except that an erasing light exposure amount calculating means 18a comprising a peak detector 12, an erasing light exposure amount calculating circuit 14b for calculating the illuminance and exposure time of erasing light, and a memory 15 is used instead of the exposure time calculating means 18, and an erasing light exposure amount adjusting means 17b comprising a power source 21, a power control circuit 22 and a timer 23 is used instead of the exposure time adjusting means 17.

The erasing light exposure amount calculating circuit 14b calculates the illuminance and exposure time of erasing light on the basis of the predetermined relationship among the output Smax of the peak detector 12, the illuminance and the exposure time of erasing light corresponding to the output Smax. The signal generated by the erasing light exposure amount calculating circuit 14b is stored in the memory 15. When the stimulable phosphor sheet 4 is conveyed and maintained at a position below the erasing lamp 16, the signal is sent from the memory 15 to the power control circuit 22 and the timer 23 of the erasing light exposure amount adjusting means 17b to control the power fed to the erasing lamp 16 and the on time of the lamp 16.

Figure 7:
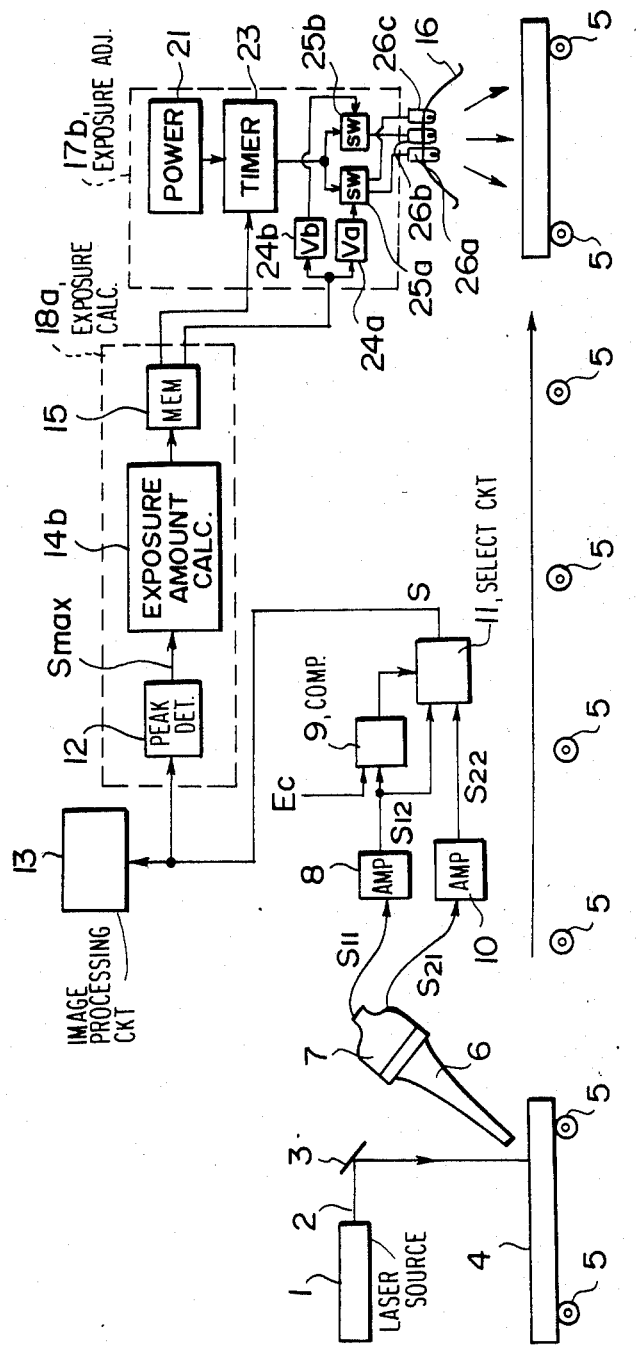

FIG. 7 shows a further embodiment of the residual image erasing apparatus in accordance with the present invention. The embodiment of FIG. 7 is similar to the embodiment of FIG. 6, except that comparators 24a and 24b respectively having threshold values Va and Vb (Va Vb) and switches 25a, 25b are used instead of the power control circuit 22, and the erasing lamp 16 is provided with independent light emitting sections 26a, 26b and 26c. In this embodiment, the signal generated by the erasing light exposure amount calculating means 18a in the same manner as described with reference to FIG. 6 is sent to the erasing light exposure amount adjusting means 17b. In this case, the signal representing the illuminance of erasing light is sent to the comparators 24a and 24b. When the signal value is larger than Va, the switches 25a and 25b are turned on, light emitting sections 26a, 26b and 26c emit light simultaneously, and the maximum illuminance is obtained. When the signal value is an intermediate value between Va and Vb, the switch 25a is turned off and the switch 25b is turned on. Thus the light emitting sections 26b and 26c emit light simultaneously. When the signal value is smaller than Vb, the switches 25a and 25b are turned off, and only the light emitting section 26c emits light. The signal representing the erasing light exposure time is sent to the timer 23, and the light emission time of the light emitting sections 26a, 26b and 26c is controlled by the signal sent from the timer 23. In this embodiment, since the power control circuit 22 in FIG. 6 becomes unnecessary, the circuit configuration becomes simple.

It is also possible to position many comparators having different threshold values in parallel with each other.

Figure 8:
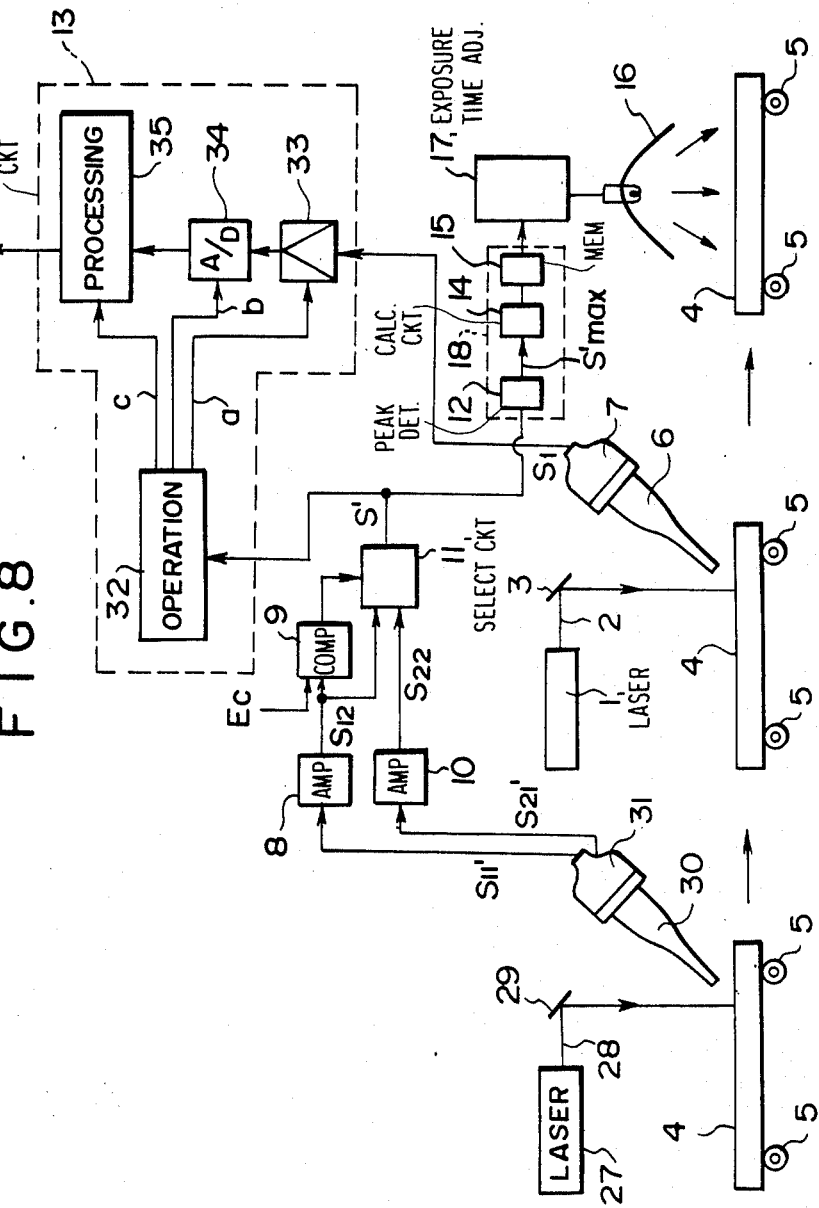

FIG. 8 shows a still further embodiment of the residual image erasing apparatus in accordance with the present invention, wherein the erasing light exposure amount is controlled by a preliminary read-out means for detecting in advance the radiation image stored in the stimulable phosphor sheet.

First, the stimulable phosphor sheet carrying a radiation image stored therein is subjected to preliminary read-out for grasping in advance the radiation image at a preliminary read-out section. The preliminary read-out is conducted in nearly the same manner as the image read-out. That is, a laser beam 28 emitted by a laser beam source 27 is one-dimensionally deflected by a light deflector 29 and is made to impinge upon the stimulable phosphor sheet 4. At the same time, the stimulable phosphor sheet 4 is moved at a predetermined speed by the conveying rollers 5. Thus the whole surface of the stimulable phosphor sheet 4 is exposed to the laser beam 28. The stimulable phosphor sheet 4 emits light upon exposure to the laser beam 28, and the emitted light enters a light guide member 30 and is detected by a photomultiplier 31.

The photomultiplier 31 produces an output current signal S11' and a signal S12' representing the voltage generated at a given bleeder resistor as in the embodiment of FIG. 3. The amplifier, the comparator, the selection circuit, the erasing light exposure time calculating circuit and the exposure time adjusting means used for these signals are the same as those in FIG. 3.

The output signal S' of the selection circuit 11 is sent to an operation circuit 32 which calculates a read-out gain setting value (a), a scale factor (b) and an image processing condition setting value (c) on the basis of the radiation image information obtained by the preliminary read-out, i.e. the output signal S'.

After the preliminary read-out is finished, the stimulable phosphor sheet 4 is conveyed by the conveying rollers 5 and subjected to image read-out which is conducted in the same manner as described with reference to FIG. 3. That is, the light emitted by the stimulable phosphor sheet 4 in proportion to the stored radiation energy when the sheet 4 is exposed to the laser beam 2 is detected by the photomultiplier 7. The image signal S1 thus generated by the photomultiplier 7 is amplified to an appropriate level by an amplifier 33 the sensitivity of which is adjusted by the read-out gain setting value (a), and the amplified signal is sent to an A/D converter 34. In the A/D converter 34, the signal is converted into a digital signal by use of a scale factor adjusted by the scale factor setting value (b) to suit the width of signal fluctuation. The digital signal is then sent to a signal processing circuit 35 which processes the signal on the basis of the image processing condition setting value (c) to obtain a visible image suitable for viewing, particularly for diagnostic purposes. The signal thus processed is sent to an image reproducing apparatus (not shown). After the image read-out is finished, the stimulable phosphor sheet 4 is conveyed by the conveying rollers 5 to a position below the residual image erasing lamp 16 and is maintained to stand at the position. At this position, the exposure time adjusting means 17 is activated by the output signal of the erasing light exposure time calculating means 18 to control the on time of the erasing lamp 16 in the same manner as described with reference to FIG. 3.

Also, at the preliminary read-out step, the intensity of the light emitted by the stimulable phosphor sheet 4 is proportional to the level of residual radiation energy on the sheet 4. Therefore, it is possible to economically erase the residual image by controlling the on time of the erasing lamp 16 in accordance with the light emission level detected by the photomultiplier 31 for the preliminary read-out.

In the embodiment of FIG. 8, the erasing light exposure amount is controlled by controlling the erasing light exposure time in accordance with the intensity of light emission detected by the photomultiplier 31 for the preliminary read-out. However, it is also possible to control both the illuminance and the exposure time of erasing light as described above.

In the aforesaid embodiments, the peak detector 12 is used to detect the maximum value Smax (or S'max) of the output signal S (or S') of the selection circuit 11, and the light exposure amount in residual image erasing is controlled on the basis of the detected maximum value. It is advantageous that the light exposure amount in residual image erasing be controlled on the basis of the maximum value of the output signal S in this manner. However, it is also possible to calculate the maximum value, the minimum value and the average value of the output signal S of the selection circuit 11, and to control the light exposure amount in residual image erasing on the basis of the average value of the output signal S when the difference between the maximum value and the minimum value is smaller than a predetermined value, i.e. when the contrast of the residual image is low.

In the case where residual image erasing is conducted again just before a radiation image is recorded on the stimulable phosphor sheet, it is possible to control the light exposure amount in residual image erasing on the basis of the average value of the output signal S of the selection circuit at the residual image erasing step just after the image read-out as in the aforesaid embodiments.

We claim:

1. A method of erasing a residual image on a stimulable phosphor sheet in which a stimulable phosphor sheet capable of being repeatedly used for radiation image recording and read-out is exposed to erasing light after radiation image read-out, and the residual image caused by residual radiation energy on the stimulable phosphor sheet is erased, the method of erasing a residual image on a stimulable phosphor sheet comprising the steps of: detecting a voltage generated at a bleeder resistor of a photomultiplier for conducting the image read-out at the step of said radiation image read-out at least for the stimulable phosphor sheet or a portion thereof where the level of X-ray exposure amount is higher than a predetermined level, and controlling the exposure amount of said erasing light on the basis of the detected voltage.

2. A method as defined in claim 1 wherein said photomultiplier is the one used for conducting preliminary read-out, and said voltage is detected at the step of preliminary read-out.

3. A method as defined in claim 1 wherein said photomultiplier is the one used for conducting final read-out, and said voltage is detected at the step of final read-out.

4. A method of erasing a residual image on a stimulable phosphor sheet in which a stimulable phosphor sheet capable of being repeatedly used for radiation image recording and read-out is exposed to erasing light after radiation image read-out, and the residual image caused by residual radiation energy on the stimulable phosphor sheet is erased, the method of erasing a residual image on a stimulable phosphor sheet comprising the steps of: controlling the exposure amount of said erasing light on the basis of an output current of a photomultiplier for conducting the radiation image read-out when said output current of said photomultiplier is equal to or smaller than a predetermined value which is smaller than a saturated value of said output current, and detecting a voltage generated at a bleeder resistor of said photomultiplier and controlling the exposure amount of said erasing light on the basis of the detected voltage when said output current of said photomultiplier is larger than said predetermined value.

5. A method as defined in claim 4 wherein said photomultiplier is the one used for conducting preliminary read-out, and said voltage is detected at the step of preliminary read-out.

6. A method as defined in claim 4 wherein said photomultiplier is the one used for conducting final read-out, and said voltage is detected at the step of final read-out.

7. An apparatus for erasing a residual image on a stimulable phosphor sheet, which comprises:
(i) a photomultiplier for conducting read-out of a radiation image stored in the stimulable phosphor sheet,
(ii) an erasing light source for emitting the erasing light for erasing the residual image on said stimulable phosphor sheet,
(iii) a voltage detection means for detecting the voltage generated at a bleeder resistor of said photomultiplier, and
(iv) a control means for controlling the exposure amount of said erasing light for erasing the residual image on the basis of the voltage detected by said voltage detection means.

8. An apparatus for erasing a residual image on a stimulable phosphor sheet, which comprises:
(i) a photomultiplier for conducting read-out of a radiation image stored in the stimulable phosphor sheet,
(ii) an erasing light source for emitting the erasing light for erasing the residual image on said stimulable phosphor sheet,
(iii) a comparison means for comparing an output current signal of said photomultiplier with a predetermined reference value,
(iv) a voltage detection means for detecting the voltage generated at a bleeder resistor of said photomultiplier,
(v) a selection circuit for receiving the output current signal of said photomultiplier, a voltage signal detected by said voltage detection means, and an output of said comparison means, selecting the output current signal of said photomultiplier when the output current signal of said photomultiplier is equal to or lower than said reference value, and selecting said voltage signal when the output current signal of said photomultiplier is higher than said reference value, and
(vi) a control means for controlling the exposure amount of said erasing light for erasing the residual image on the basis of the output of said selection circuit.

* * * * *